United States Patent [19]
Lagos et al.

[11]  4,175,941
[45]  Nov. 27, 1979

[54] INTERNAL COATING PROCESS FOR GLASS TUBING

[75] Inventors: Costas C. Lagos, Danvers; Ricardo A. Lanio, Andover; John L. Crowley, Rowley, all of Mass.; Norman A. Moreau, Hampton, N.H.

[73] Assignee: GTE Sylvania Incorporated, Stamford, Conn.

[21] Appl. No.: 953,246

[22] Filed: Oct. 20, 1978

Related U.S. Application Data

[63] Continuation-in-part of Ser. No. 901,177, Apr. 28, 1978, abandoned.

[51] Int. Cl.$^2$ ............................................. C03C 17/18
[52] U.S. Cl. ................................... 65/60 B; 65/60 C; 65/60 D; 65/77; 65/86
[58] Field of Search ................... 65/60 B, 60 C, 60 D, 65/77, 86, 87, 88

[56]  References Cited
U.S. PATENT DOCUMENTS

| | | | |
|---|---|---|---|
| 3,410,672 | 11/1968 | De Lajarte | 65/60 B X |
| 3,451,795 | 6/1969 | Budd | 65/60 B X |
| 3,689,304 | 9/1972 | Bamford | 65/60 B X |
| 3,856,979 | 12/1974 | Schmid | 175/15 C |
| 3,873,293 | 3/1975 | Rudd et al. | 65/86 X |
| 3,984,591 | 10/1976 | Plumat et al. | 65/60 D X |
| 4,125,391 | 11/1978 | Laethem | 65/60 C X |

FOREIGN PATENT DOCUMENTS 2000195  1/1969  France ......................................... 65/88

Primary Examiner—Arthur D. Kellogg
Attorney, Agent, or Firm—James Theodosopoulos

[57]  ABSTRACT

A transparent, electrically conductive film of tin oxide is formed on the inner surface of tubing or blown glassware by dispensing therein a solution containing tin chloride and hydrofluoric acid. The solution is dispensed while the glassware is being formed and while the glass is in a softened state.

5 Claims, 1 Drawing Figure

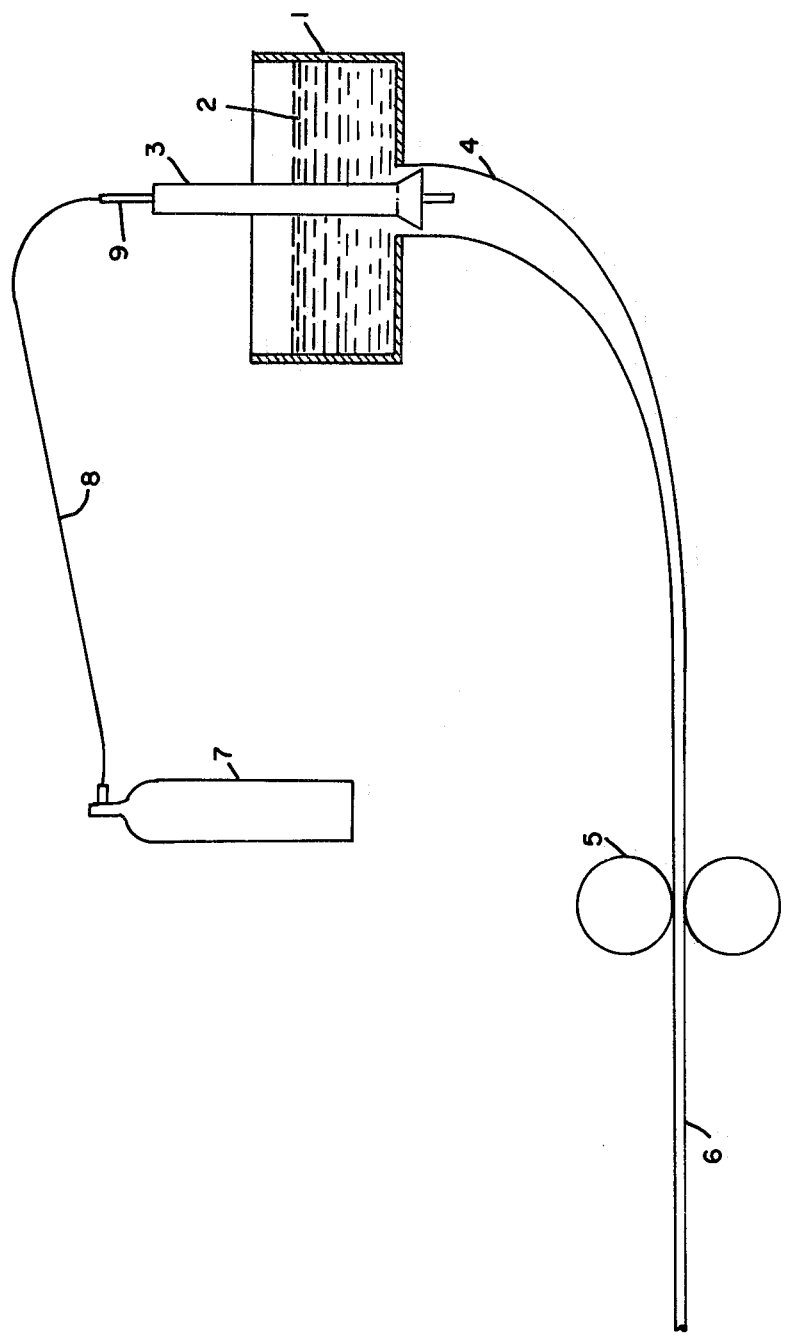

INTERNAL COATING PROCESS FOR GLASS TUBING

THE INVENTION

This application is a continuation-in-part of Ser. No. 901,177 filed April 28, 1978, now abandoned.

This invention is concerned with the deposition of a transparent electrically conductive tin oxide film on the inner surface of glassware, for example, tubing to be used, for example, in the manufacture of fluorescent lamps. The use of such a film is disclosed in U.S. Pat. No. 4,020,385.

In the prior art, such tin oxide films were generally deposited by means of liquid sprays or liquid-gas sprays or by chemical vapor deposition techniques. The temperature of the glass during deposition was less than its softening temperature.

In this invention, the tin oxide film is deposited on the glass while the glass is at a temperature above its softening point temperature. The film is deposited from an aqueous solution that is applied to the softened glass in the form of a liquid stream. The solution contains tin chloride and hydrofluoric acid.

The drawing is a diagrammatic representation of apparatus that can be used to practice the invention.

As shown in the drawing, a tank 1 contains molten glass 2 which is drawn down around mandrel 3 to form a bag 4 of softened glass which is drawn by tractor 5 to form tubing 6. This process is known and is shown, for example, in U.S. Pat. No. 2,009,793. A container 7 contains a solution as per this invention which is carried by line 8 into tube 9. Tube 9 is disposed within mandrel 3, and the bottom of tube 9 projects into bag 4 where the solution can be disposed onto the softened glass.

Because the solution impinges on molten glass bag 4 as a liquid stream, the viscosity and the specific gravity must be controlled, so that soft molten glass bag 4 and the first few feet of soft glass tubing 6 are not distorted or otherwise physically affected by the liquid stream. The viscosity should be between about 2 to 8 centistokes and the specific gravity should be no heavier than about 1.65. The viscosity and specific gravity are dependent on the concentration of $SnCl_4$ in the solution which, also, controls the conductivity of the film formed on the glass tubing. The rate of flow of the solution should be at least enough to maintain a continuous stream of liquid at the exit end of tube 9.

In one embodiment, the solution comprises tin chloride ($SnCl_4$) and hydrofluric acid (HF) in water ($H_2O$). The $SnCl_4$ can be added as $SnCl_4$ or $SnCl_4 \cdot 5H_2O$ or any other form that will give $Sn^{+4}$ amd $Cl^{-1}$ in solution. The preferred concentration of $SnCl_4$ is between 560 and 900 grams/liter. The HF concentration may be varied from about 0.5% to 10% by weight based on the equivalent $SnO_2$ concentration. Lower percentages of HF, say, about 1.5%, are preferred because of the corrosiveness of the higher HF concentrations. In order to increase the electrical conductivity of the tin oxide film, a water-soluble alcohol such as methyl, ethyl or propyl may be included with the water in an amount, say, up to about 75% by volume of the total solvent.

An electrically conductive tin oxide film can also be formed on blown glassware, for example, incandescent lamp envelopes as made on a ribbon machine, There, a ribbon of softened glass is introduced into a blow box where air is introduced through a blow head to blow a hot bag of softened glass against a mold into the shape of an incandescent lamp envelope. A tube is placed within the blowhead and is used to introduce a solution as per this invention and dispense it against the internal surface of the hot bag of softened glass as the softened glass is being blown into the shape of the mold.

We claim:

1. The method of depositing a conductive film of tin oxide on the inner surface of tubular or blown glassware comprising the steps of: drawing hot glass from a glass melt through a bag state where the glass is above its softening temperature; and dispensing into the hot bag an aqueous solution containing tin chloride and hydrofluoric acid, while the hot bag is being formed into tubing or blown ware.

2. The method of claim 1 wherein the viscosity of the solution is such that the solution impinges on the hot glass as a liquid.

3. The method of claim 2 where the viscosity of the solution is about 2 to 8 centistokes.

4. The method of claim 1 wherein the specific gravity of the solution is less than about 1.65 so that the liquid stream does not physically distort the hot glass when it impinges thereon.

5. The method of claim 1 wherein said aqueous solution also contains a water-soluble alcohol.

* * * * *

Dedication 4,175,941.—*Costas C. Lagos,* Danvers; *Richardo A. Lanio,* Andover; *John L. Crowley,* Rowley, Mass., and *Norman A. Moreau,* Hampton, N.H. INTERNAL COATING PROCESS FOR GLASS TUBING. Patent dated Nov. 27, 1979. Dedication filed Mar. 23, 1981, by the assignee, *GTE Sylvania Inc.*

Hereby dedicates to the Public the remaining term of said patent.
[*Official Gazette June 9, 1981.*]